United States Patent [19]

Dardashti

[11] Patent Number: 5,595,312

[45] Date of Patent: Jan. 21, 1997

[54] EASILY ASSEMBLED AND ADJUSTABLE STORAGE AND DISPLAY TOWER ASSEMBLY

[76] Inventor: Shahriar Dardashti, c/o Atlantic Representations, Inc., P.O. Box 2399, Santa Fe Springs, Calif. 90670

[21] Appl. No.: 613,926

[22] Filed: Mar. 11, 1996

[51] Int. Cl.⁶ .................................................. A47F 7/00
[52] U.S. Cl. ................................. 211/188; 211/41
[58] Field of Search ............................ 211/40, 188, 41, 211/189, 194; 206/387; 312/107, 108; D6/407

[56] References Cited

U.S. PATENT DOCUMENTS

| | | |
|---|---|---|
| D. 51,055 | 7/1917 | Board . |
| D. 129,636 | 9/1941 | Dreyfuss . |
| D. 134,294 | 11/1942 | Papas . |
| D. 152,330 | 1/1949 | Dillon . |
| D. 205,114 | 6/1966 | Brinley . |
| D. 244,499 | 5/1977 | Parfitt . |
| D. 305,836 | 2/1990 | Maia . |
| D. 318,280 | 7/1991 | Sumrell et al. . |
| D. 321,296 | 11/1991 | Miranda . |
| D. 325,137 | 4/1992 | Porter . |
| D. 339,485 | 9/1993 | James . |
| D. 357,160 | 4/1995 | Fritze . |
| D. 357,331 | 4/1995 | Yeh . |
| D. 360,329 | 7/1995 | Chu . |
| D. 363,626 | 10/1995 | Herbst . |
| D. 368,396 | 4/1996 | Bidwell . |
| D. 368,815 | 4/1996 | Keller et al. . |
| 816,053 | 3/1906 | Wittbold . |
| 900,331 | 10/1908 | Weston . |
| 1,265,373 | 5/1918 | Phillip . |
| 2,143,592 | 1/1939 | Baldeck . |
| 3,684,285 | 8/1972 | Kane . |
| 4,351,244 | 9/1982 | Suttles . |
| 4,678,089 | 7/1987 | Lang . |
| 4,940,150 | 7/1990 | Spengler . |
| 5,195,642 | 3/1993 | Dardashti .................... 211/40 X |
| 5,314,077 | 5/1994 | Theosabrata ..................... 211/40 |
| 5,341,943 | 8/1994 | Fraser ........................... 211/40 |
| 5,358,124 | 10/1994 | Mueller ..................... 211/40 X |
| 5,370,242 | 12/1994 | Huang ........................... 211/40 |

FOREIGN PATENT DOCUMENTS

| | | |
|---|---|---|
| 193201 | 9/1986 | European Pat. Off. . |
| 476729 | 3/1992 | European Pat. Off. . |
| 1144164 | 10/1957 | France . |

*Primary Examiner*—Ramon O. Ramirez
*Assistant Examiner*—Sarah L. Purol
*Attorney, Agent, or Firm*—Poms, Smith, Lande & Rose Professional Corporation

[57] ABSTRACT

A storage and display tower assembly transported and distributed in a compact and disassembled kit form in a box. The components thereof are easily and readily assembled to the configuration selected by the user to provide the desired appearance and use. The shelves, pinch clamps, weighted base and first and second sets of rods of the kit are removed from the box. The rods of the first set are threaded into upright securement to the base; a first shelf is slid through its openings on the rods; the lower ends of the second set of rods are threaded on top of the top ends of the respective rods of the first set with a stabilizing and article display shelf sandwiched and fixed between them; and a second shelf is slid through its openings onto the rods of the second set. Using the support clamps, the first and second shelves are mounted at the desired heights to the first and second sets of rods, respectively. Decorative balls, plates and/or lamps can be attached at the top of the tower thereby defined. The sets of rods can consist of three or five rods. For the five rod embodiment the adjustable shelves can be large to having five openings to engage all five rods or can be smaller having only three openings each for side-by-side or staggered placement. The shelves are adapted to store and display various media including video cassettes and compact disc cases as well as books, plants, knick-knacks and other articles in any number of desirable and convenient arrangements. The numbers, sizes and spacings of the shelves can be adjusted from time to time to store and display different articles and/or to simply provide a different look.

26 Claims, 9 Drawing Sheets

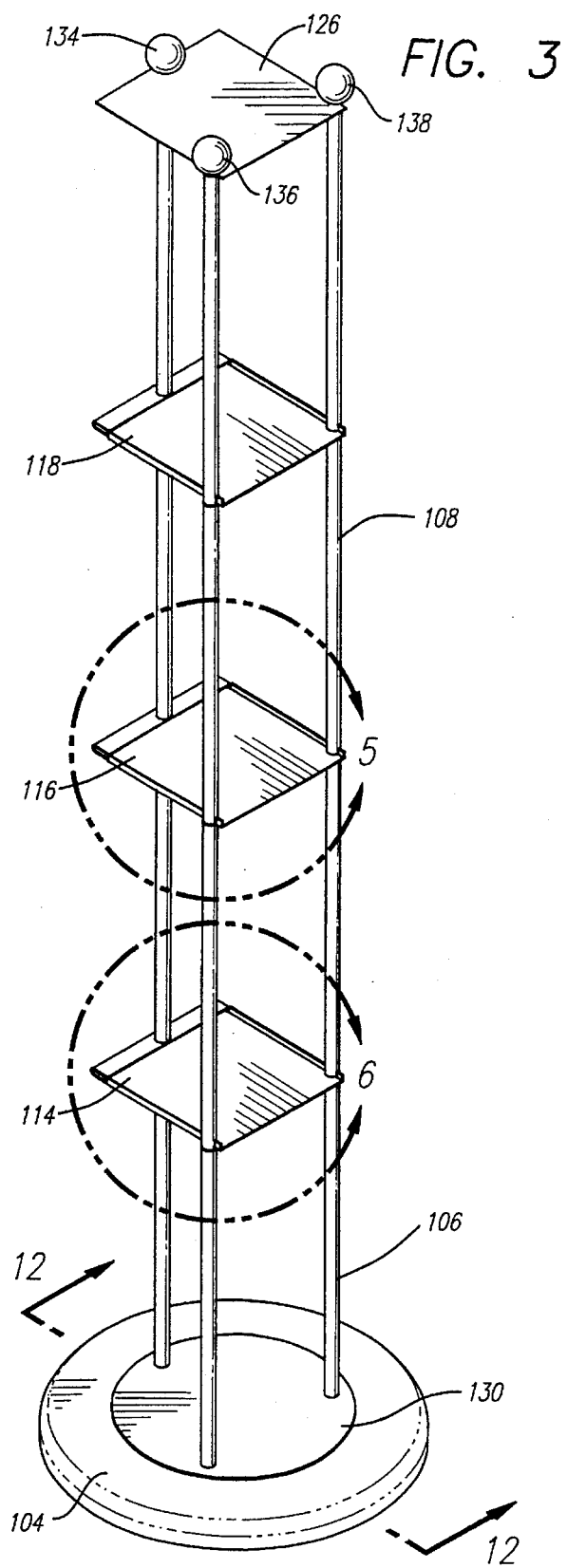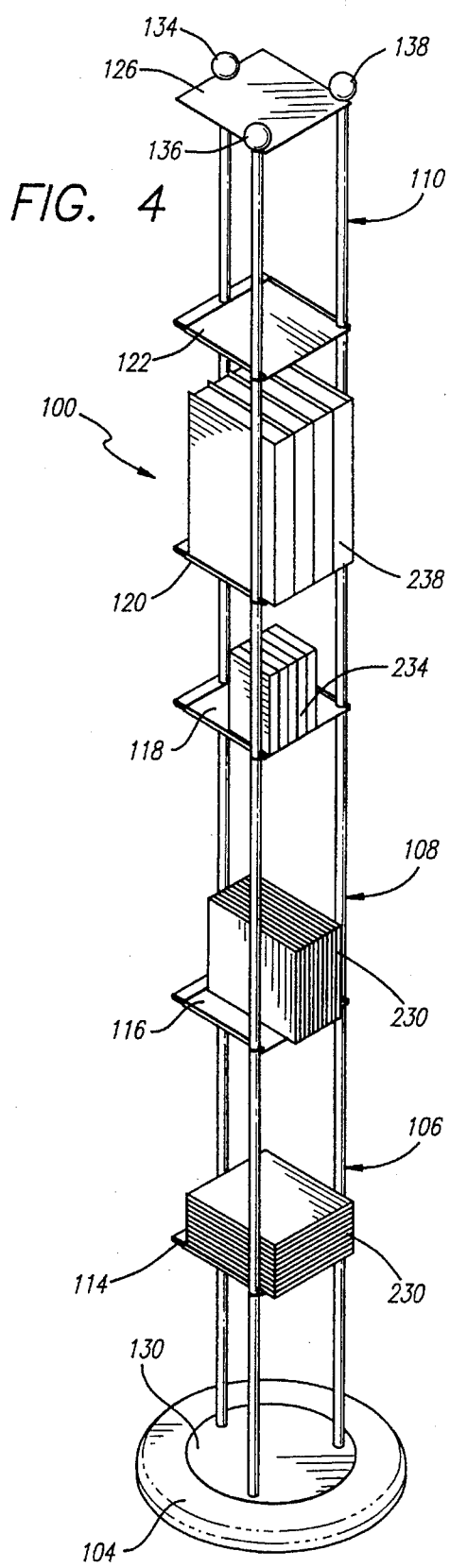

FIG. 18
FIG. 19
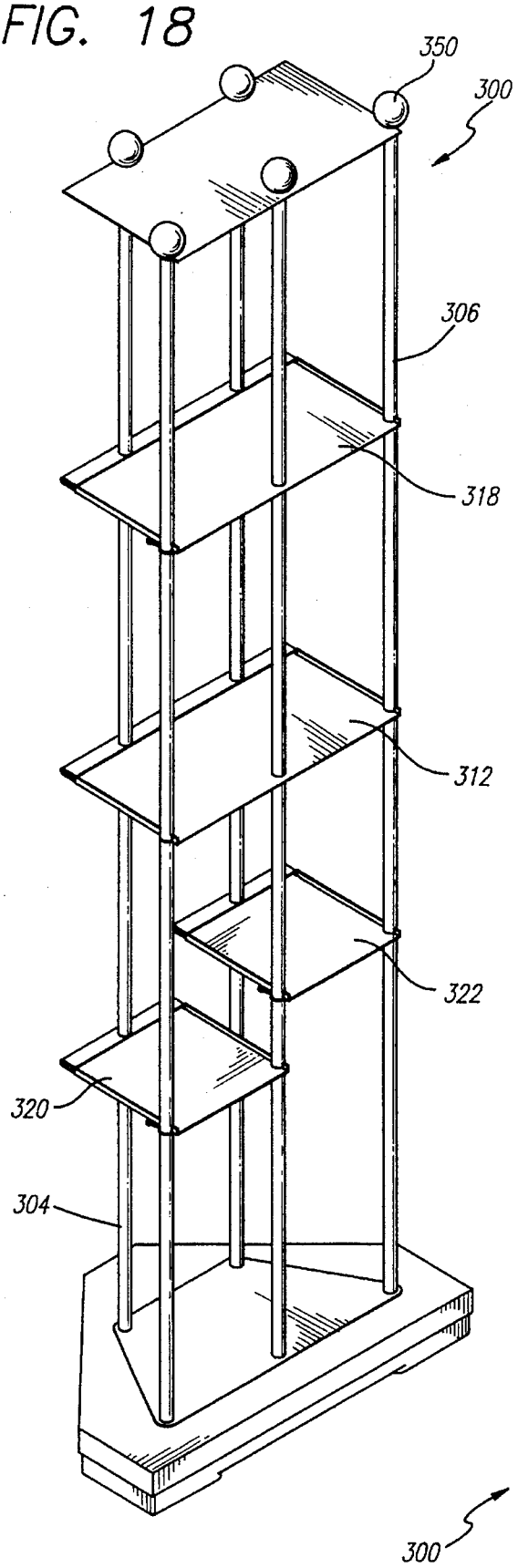
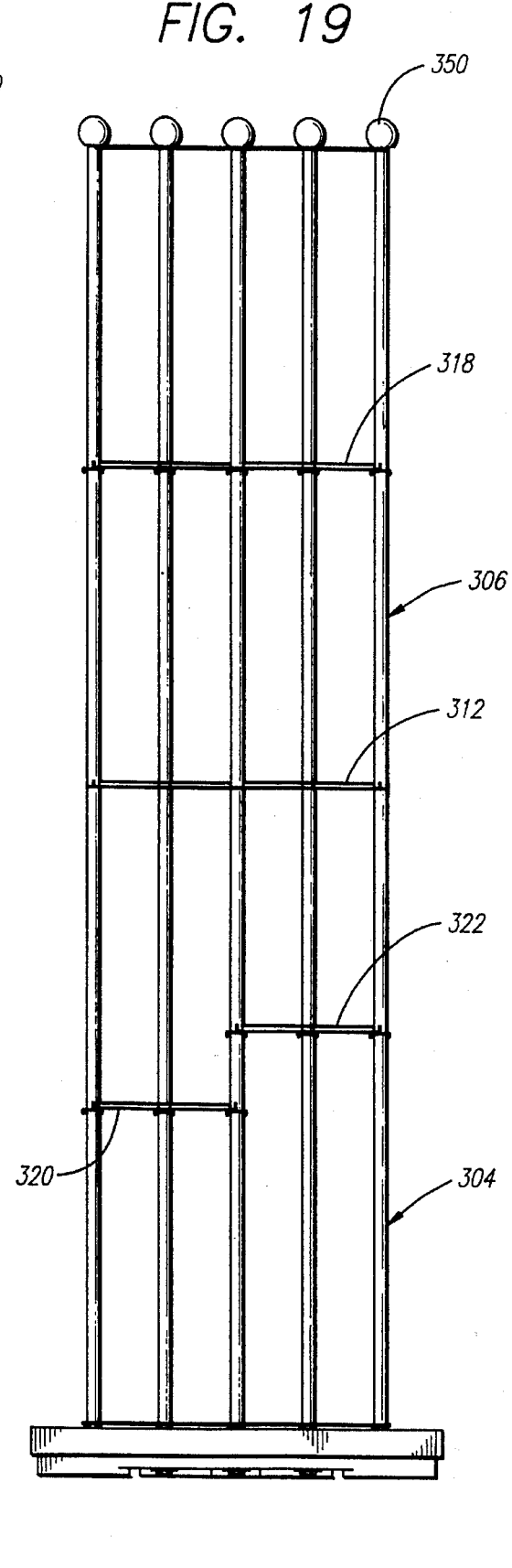

EASILY ASSEMBLED AND ADJUSTABLE STORAGE AND DISPLAY TOWER ASSEMBLY

BACKGROUND OF THE INVENTION

The present invention relates to assemblies for storing and displaying different items and particularly audio/visual media, such as compact disks and video cassettes.

Numerous shelving towers and other structures for storing and displaying compact disks, video cassettes and the like are known. Examples thereof are shown in U.S. Pat. No. 5,195,642 to Dardashti and Des. No. 344,360 to Yeh. However, none of the prior art systems (1) has the flexibility to attractively store and display the disks, cassettes and/or the like in numerous different configurations and arrangements as selected by the user, (2) can be easily and inexpensively manufactured, (3) can be transported, stored and sold in small containers or boxes, and (4) can be easily assembled by the user into the desired variable configurations.

SUMMARY OF THE INVENTION

Directed to remedying the problems and satisfying the needs of the prior art, an adjustable storage and display tower assembly is herein disclosed. The assembly is provided disassembled and conveniently packaged in a small box. A first set of rods removed from the box is screwed upright in spaced parallel relation to the base and a second set is screwed on to the tops of the first set. Sandwiched between the joined rods at their juncture is a fixed plate shelf. Adjustable plate shelves are slid along the rods to the desired height and held in place with adjustable clamps on the rods. Each set of rods can consist of three or five rods depending on the desired tower size and configuration. For the five rod embodiment the fixed shelves preferably engage all five rods and hold them together. However, the adjustable shelves can be either large to engage all five rods or small to engage only three or various combinations thereof. Third (fourth, etc.) sets of rods can be threaded to the tops of the second sets if additional tower height is desired.

A plate can be positioned at the top of the second (or top) set of rods attractively fixing the tops of the rods together and decorative elements attached to the rod top ends. Alternatively, a lamp can be mounted at the top of the tower, facing upward, and the lamp cord clamped out of the way to one of the rods.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 3 is a perspective view of an assembled (three rod) tower assembly stacked two rods high;

FIG. 4 is a perspective view of an assembled (three rod) tower assembly stacked three rods high with additional adjustable shelves and showing various articles stored and displayed on the shelves;

FIG. 18 is a perspective view of a five rod tower assembly; and

FIG. 19 is a front elevational view of the tower assembly of FIG. 18.

DETAILED DESCRIPTION OF PREFERRED EMBODIMENTS OF THE INVENTION

Figure 1:
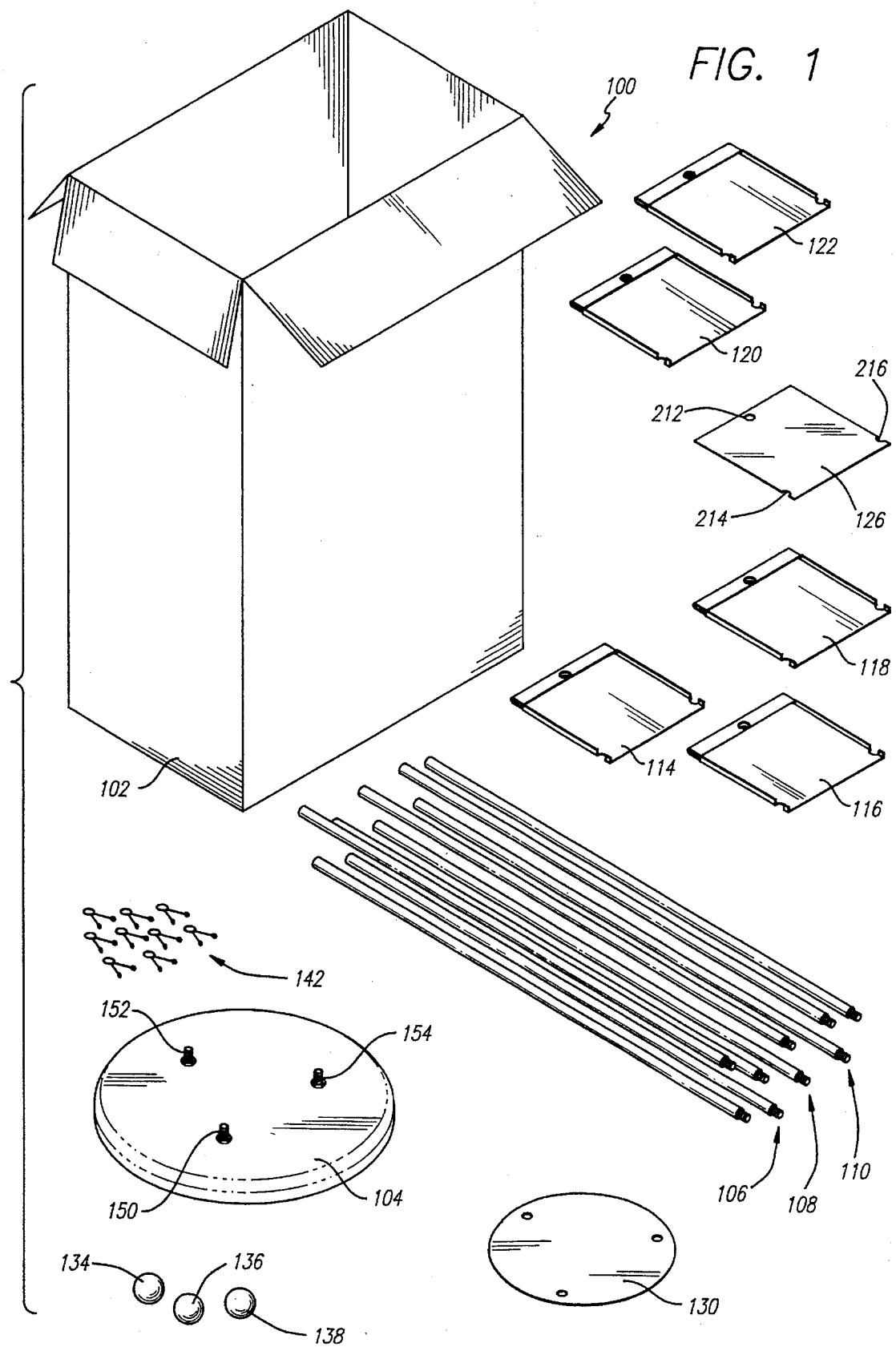
FIG. 1 is a perspective view of the components of one storage and display tower assembly of the present invention.

Referring to the drawings, a number of different embodiments of the present invention are illustrated. Two prime advantages of the present invention are first that it can be manufactured and provided to the consumer in small boxes. The small boxes make it easier and cheaper for the manufacturer, distributor and ultimate user to store, ship and display. The second prime advantage is that the present assembly is very flexible in its use allowing it to be built and/or also subsequently modified and even its height adjusted as needed to accommodate the storage and display of different articles as needs may vary and also to provide an alternative lamp arrangement.

One of the more simple embodiments of the present invention is illustrated in disassembled form in FIG. 1 generally at 100 (and assembled in FIG. 4). Referring thereto it is seen that all the components come packaged in a box 102. The components include a heavy weighted base assembly 104, first, second and third sets of (three) rods 106, 108, 110, a plurality of shelves 114, 116, 118, 120, 122, a top fixed plate 126, a base plate 130 for placement on the base assembly, three decorative top balls 134, 136, 138, and a plurality of clamps shown generally at 142. As can be understood from FIG. 1, with all these components disassembled they can be placed and packaged into a small container such as the box 102 illustrated therein.

The assembly of the storage and tower assembly 100, one embodiment of which is shown in FIG. 4, for example, is relatively easy. It is anticipated that an instruction sheet (not shown) will be provided in the box 102 explaining the assembly steps. However, simply from an assembled picture such as might be provided on the box 102 itself and from examination of the components, most people would be able to assemble this storage and display assembly 100 with relative ease. The instruction sheet, for example, can include an exploded perspective view such as shown in FIG. 2.

Referring thereto, it is seen that the weighted base assembly 104 is provided with three upstanding threaded members 150, 152, 154 over which a base plate 130 is fitted through its three openings. The first set of three rods 106 are therein threaded onto respective ones of the top portions of the threaded members 150, 152, 154 extending up from the base assembly 104. A first adjustable shelf 114 is slid via its openings onto and over the three rods with three support clips 142 being first slid down on the respective rods. These clips 142 then support the adjustable shelf 142 at the desired height and location on the three rods as selected by the user. (Markings can be provided on the rods to show preferred clip or shelf locations.) One embodiment of the clips 142 would allow them to be fitted on the rods 106 without having to slip over one of the ends. This would allow the clips 142 to be attached to the rods 106 after the rods have been assembled and the shelves 114 in place should it become necessary to do so. This could be, for example, if the user forgot to first attach the clips or one or more needed to be replaced.

Figure 2:
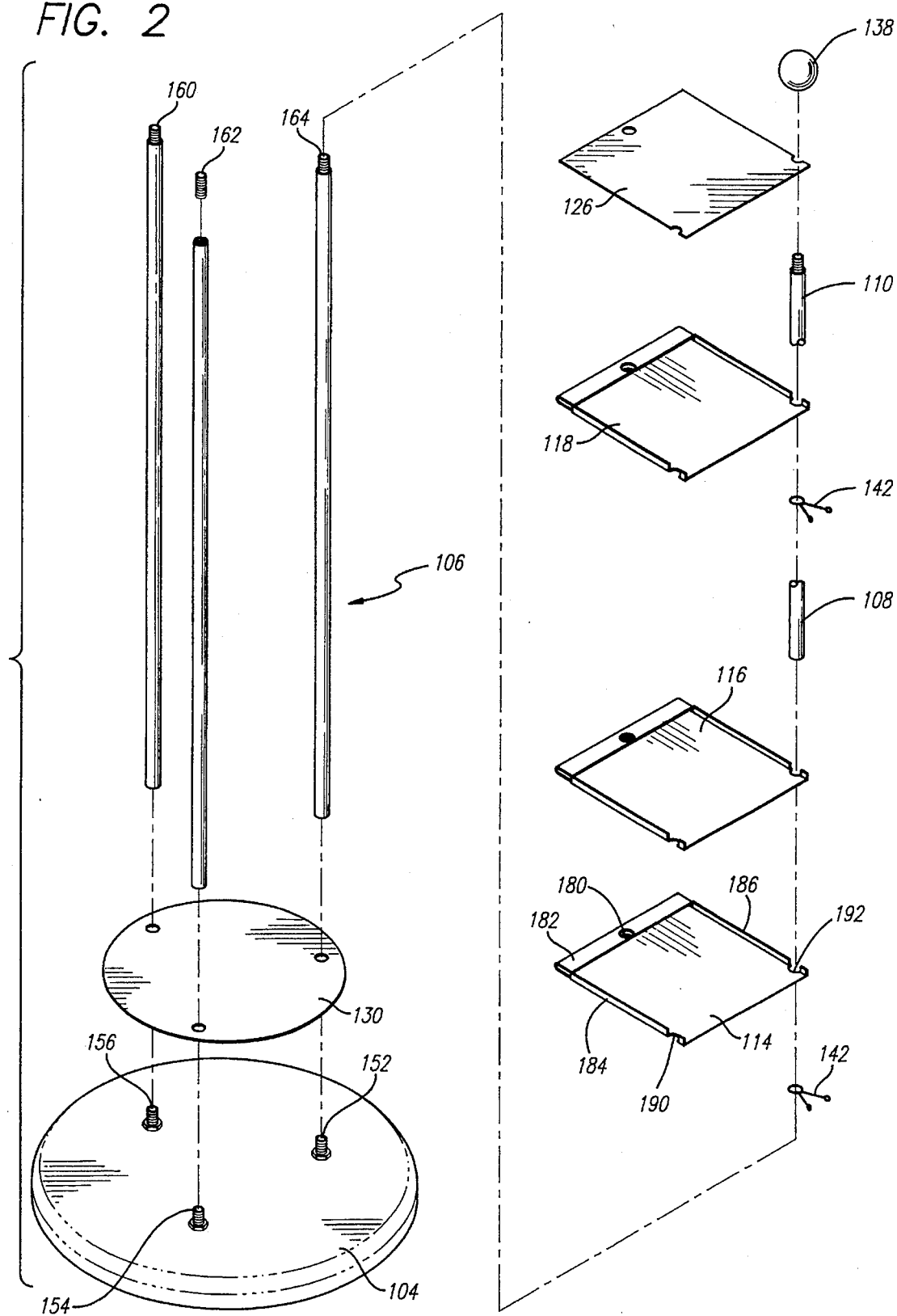
FIG. 2 is an exploded perspective view showing a partial assembly of the components of FIG. 1.
Figure 7:
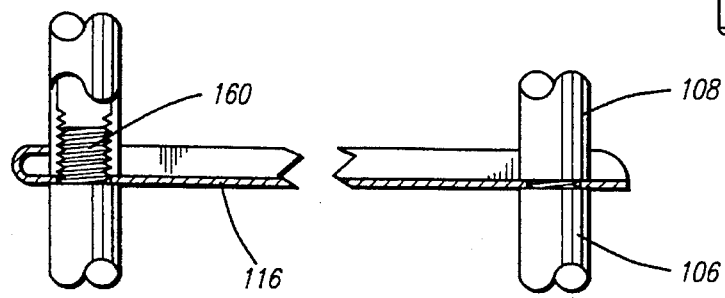
FIG. 7 is a partial enlarged cross-sectional view taken on line 7—7 of FIG. 5.
Figure 8:
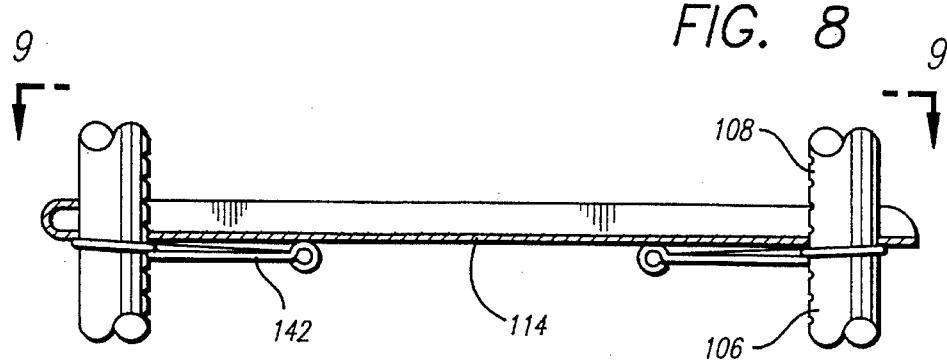
FIG. 8 is an enlarged cross-sectional view taken on line 8—8 of FIG. 6.

At the tops of each of the rods of the first set are threading members 160, 162, 164 which are threaded into the top threaded openings of the respective rods 106 to extend a slight distance above the top surfaces of the rods as can be understood from the top of left of FIG. 2. A fixed shelf 116 is then placed on top of the first set of rods 116. Its openings will be smaller than those of the adjustable shelf 114. They will be large enough to pass over the threaded top members 160, 162, 164, but small enough so as to rest on the tops of the rods 106. That is, they will be supported on the top ledges defined by the tops of the rods, as can be understood from FIG. 7. The rods of the second set 108, each of which has threaded opening in its bottom end are then threaded on top of the screw threaded members 160, 162, 164 of the first set 106 to extend straight thereabove. Thereby, the fixed shelf 116 will be sandwiched between the first and second sets of rods 106, 108 as shown in FIG. 7, for example. The second set of rods 106 will then be linearly aligned with respective ones of the rods of the first set 104. And the fixed shelf 116 will be sandwiched between the rods. The fixed shelf 116 not only provides a display and storage shelf function but also helps to fix the rods 104, 106 in a triangular relationship relative to one another.

Figure 10:
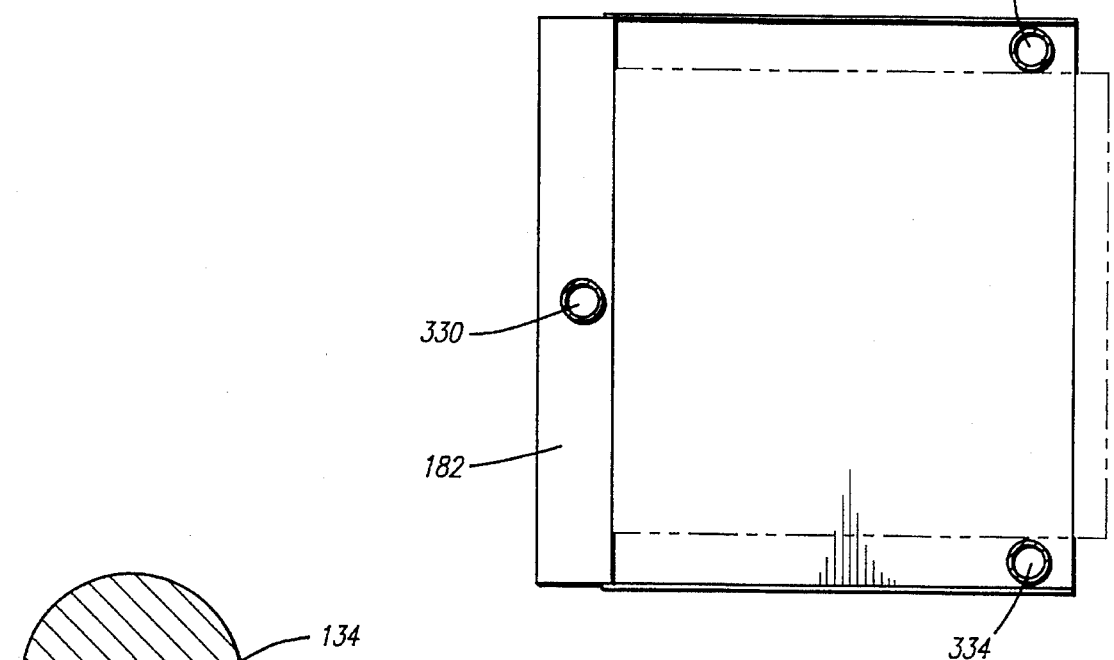
FIG. 10 is a view similar to that of FIG. 9 showing an alternative shelf design.

Adjustable shelves 118 and their clamps or clips 142 will then be fitted down on the top ends of the second set of rods 106. As shown in FIG. 2, for example, each of the shelves (both the fixed and the adjustable shelves) has a through-opening 180 passing through a rear lip 182, side rims or lips 184, 188 on the two adjacent sides and openings 190, 192 through those side lips. Those openings 190, 192 will preferably not be complete circles spaced from the edges of the shelves but rather will engage the edges and define simple crescent shapes. However, they may be full openings as shown in FIG. 10. The advantage of the crescent shape openings will be discussed later with respect to that figure. The through-hole 180 through the folded-over portion 182 of the shelf should pass through the same rod as the corresponding through-holes of the other shelves. This is so that the backs of each of these shelves are aligned, and all the shelves face forward in the same direction, as shown in FIG. 3 for example.

If additional height of the tower assembly 100 is desired for aesthetic reasons, to provide additional storage space, and/or to raise the lamp for the lamp embodiment (which will be described later), a third (and a fourth, etc.) set of rods 110 can be similarly screwed into the top of the second set 106 of rods. Similar to the first and second sets of rods 106, 108, a fixed plate 120 is sandwiched in between the tops of the second set of rods and the bottom of the third set of rods 110. Similar adjustable shelves and clips can be slid into place along the rods of the third set 110.

Figure 5:
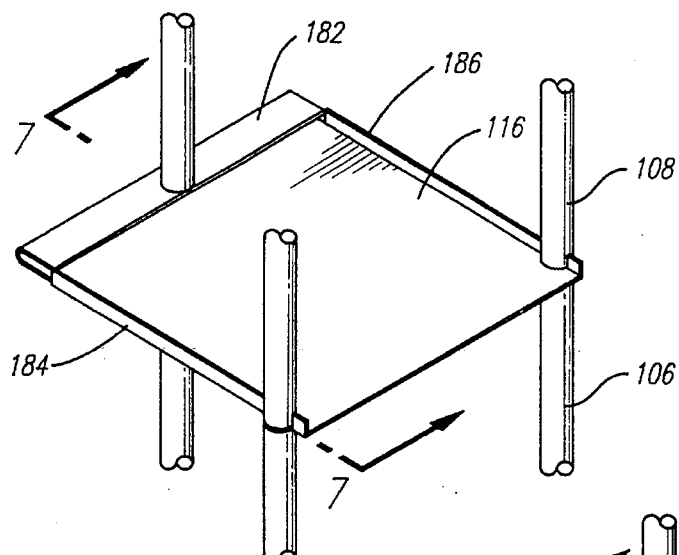
FIG. 5 is an enlarged perspective view taken on circle 5 of FIG. 3 and showing a fixed shelf mounting of the tower assembly.
Figure 6:
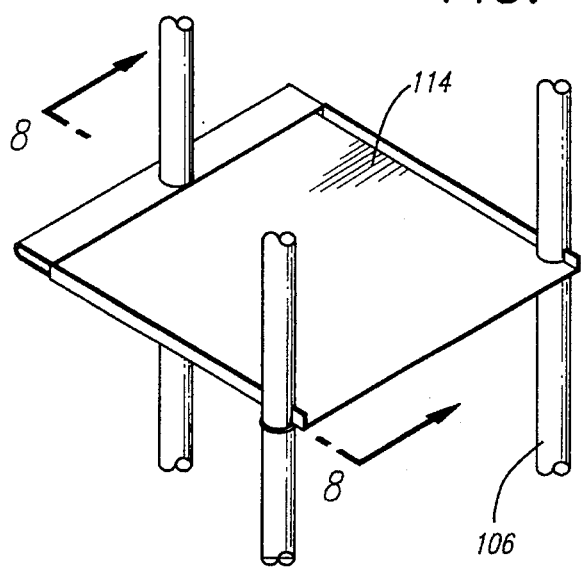
FIG. 6 is an enlarged perspective view taken on circle 6 of FIG. 3 and showing an adjustable shelf mounting.
Figure 11:
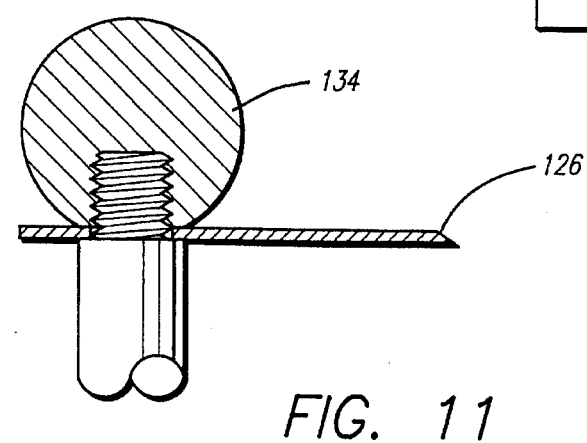
FIG. 11 is an enlarged cross-sectional view showing the mounting of a ball element at the top of the tower assembly of FIG. 3.

When the desired number of sets of rods or the desired height of the tower have been obtained (and it is anticipated that either two sets or three sets would be the preferred number), a top structure is attached to the top set of rods. One top structure embodiment includes the flat plate 126 also having a through-hole 212 and two crescent holes or openings 214, 216 to mount to the top threaded portions of the top rods. Decorative balls 134, 136, 138 (as shown in isolation in FIG. 1) having threaded openings are then threaded into place on the exposed end portions of the top rods, as shown in FIGS. 3 and 4, for example. An enlarged cross-section view showing the mounting of one of the balls 134 and the top plate 126 is provided in FIG. 11. FIG. 3 shows an example of a three rod embodiment which is stacked two sets of rods 106, 108 high with the fixed shelf 116 being shown in detail in FIG. 5 and its mounting shown in cross-section in FIG. 7.

FIG. 4 shows the storage and display assembly of the invention wherein each set of rods 106, 108, 110 consists of three rods and three sets of these rods are stacked and secured one on top of the other. In other words, the illustration of FIG. 4 is a smaller scale (for drawing convenience) than the illustration of FIG. 3 since it is essentially one third taller. FIG. 4 also shows how various articles can be stored and displayed on the shelves. Examples of the articles are compact disc (CD) cases 230 which can be stored horizontal flat like in the bottom shelf or on their sides edges as shown in the next shelf, audio cassettes 234 as shown in the shelf thereabove, and video cassette boxes 238 as shown in the shelf immediately thereabove. It will be appreciated that the rims or lips 184, 188 on the sides of the shelves block the free sliding of the articles off the sides of the shelves especially the smaller articles. And the back rim 182 prevents a free sliding of the articles off the back end of the shelves such as for the cassette disk 230 when mounted on their edges.

Figure 12:
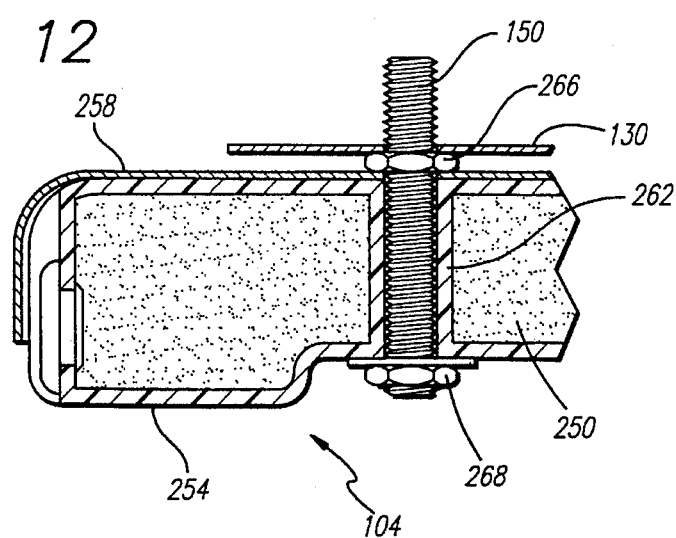
FIG. 12 is an enlarged partial cross-sectional view taken on line 12—12 of FIG. 3.

The base assembly 104 itself can come in many shapes and sizes, but should be wide and long and heavy enough to prevent tipping of the assembly. A number of different shapes of the base assembly as illustrated in the drawings such as in FIGS. 13 and 14 will be discussed. FIG. 12 shows a partial cross-section through the base assembly 104 of FIG. 3 and shows that a heavy material such as sand 250 is enclosed in a housing 254 and has a top cover 258. Vertical sleeves 262 extend through the interior of the base to receive the threaded members 150 (or 152 or 154) which are threaded with a nut like members 266, 268 to hold the threaded member in place. And the base plate 130 is illustrated on top.

Figure 13:
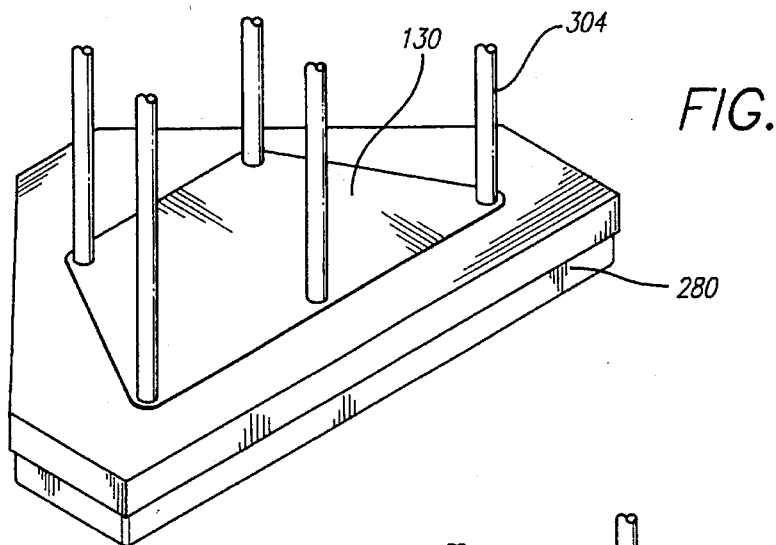
FIG. 13 is a perspective view of a bottom portion of an alternative (five rod) tower assembly of the present invention.
Figure 14:
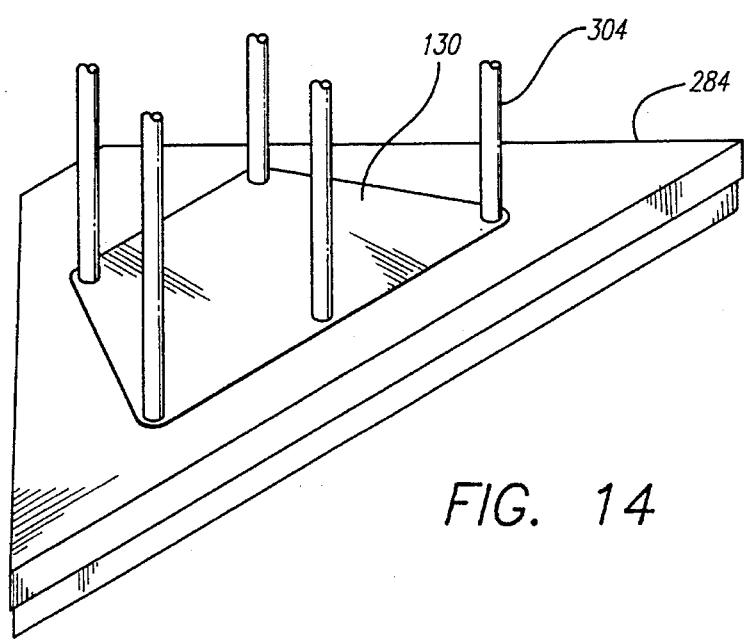
FIG. 14 is a view similar to FIG. 13 showing an alternative base configuration of a five rod tower assembly of the invention.

FIGS. 3 and 4 show embodiments wherein each set of rods consists of three rods. In contrast, FIGS. 13 and 14, for example, show a five rod embodiment. The three rod embodiments are arranged in a triangular relationship with the apex being the rear of the assembly 100. For the five rod embodiment, the rods are arranged in a trapezoid shape with four of the rods defining the corners and the fifth rod being in the center of the long front portion of the trapezoid. FIGS. 13 and 14 show examples of two different base assembly shapes, as shown at 280 and 284, as well as the support plate 130. The five rods are secured one on top of the other similar to the previously-described three rod sets. The five rod assembly shown generally at 300 in FIGS. 18 and 19 has two sets of five rods 304, 306.

The five rod assembly 300 is also provided with fixed plate(s) or shelves 312 at the junction between adjacent rods 304, 306. The fixed shelf 312 similarly provides for not only storage and-display surfaces but also helps fix or tie the rods 304, 306 together. While the fixed plate 312 should preferably be large enough to include all five rods, that is, have five openings spaced each for a respective rod, the adjustable plates need not also be large enough to include all five rods, such as plate 318. Rather, some, all or none may be smaller three rod plates such as are used in the embodiments of FIGS. 3 and 4 and shown at 320 and 322, in FIGS. 18 and 19.

Figure 9:
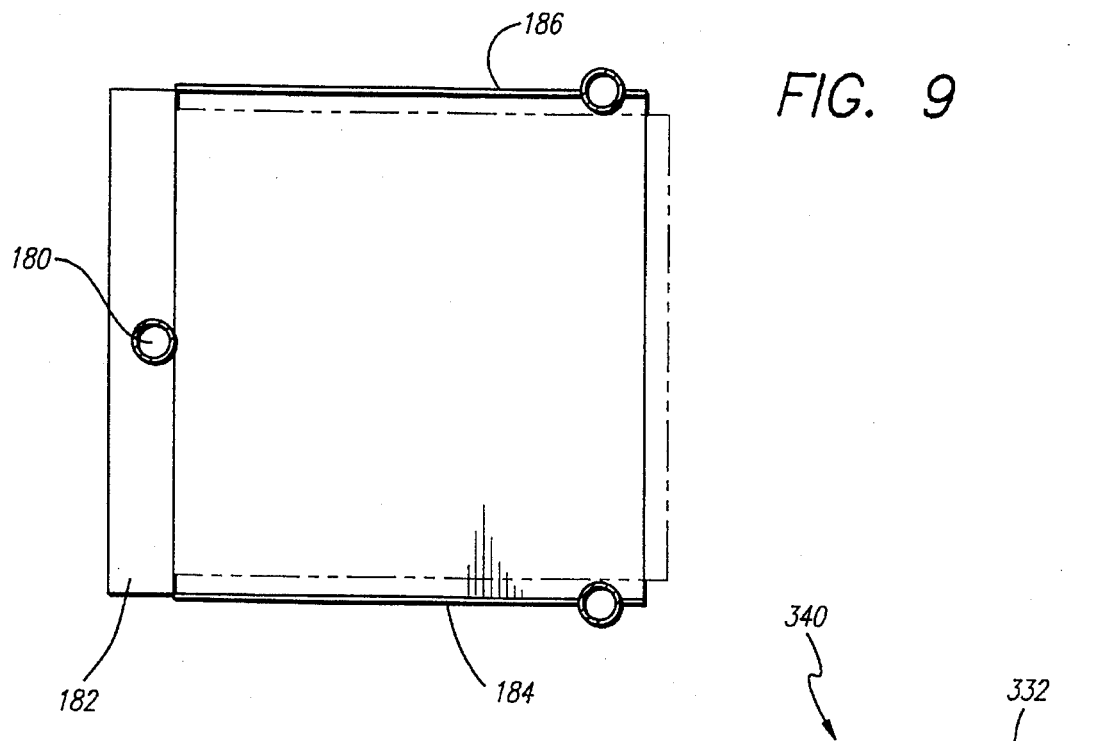
FIG. 9 is a top view taken on line 9—9 of FIG. 8.

By using the smaller three rod plates 320, 322 for the five rod type of display assemblies, held at the desired location with adjustable clips, in various combinations and arrangements, aesthetically pleasing configurations can be provided. It also makes for a configuration which can be easily changed to accommodate different storage items. A preferred embodiment is to stagger the three rod plates 320, 322 such as shown in FIGS. 18 and 19 and the lower portion thereof. They need not be staggered but can be positioned (horizontally) adjacent one another. However, when they are adjacent, they cannot stick out so far towards each other as to interfere with each other. In other words, if they had a full width with three full openings 330, 332, 334, such as the embodiment of FIG. 10 shown generally at 340, they would overlap and interfere with each other. That is why the narrower embodiment of FIG. 9 is preferred for use with the five rod embodiment. Even when the plates 320, 322 are not placed directly adjacent one another the user may want to slide one past the other to rearrange the shelves, and the embodiment of FIG. 9 allows for this.

For the three rod embodiment there are certain advantages to using the wider adjustable shelves 340 such as shown in FIG. 10. For manufacturing convenience, when the manufacturer is manufacturing the kits for both three and five rod embodiments it is preferable to only make a single design of a three rod adjustable shelf, that is one that can be used for both the three rod and the five rod embodiments. Hence, the shelf of FIG. 9 with the one through-opening and the two crescent shape side openings is shown in FIGS. 3 and 4, for example.

FIGS. 18 and 19 show two sets of five rods 304, 306 stacked one on top of the other with the two smaller adjustable plates 320, 322 at the bottom and a large five hole adjustable plate 318 in the upper portion, held in place with clips (142) or the like. Of course, one or more additional sets of five rods can be threaded to the tops of the uppermost set to extend the height of the assembly as may be desired.

The embodiments of FIGS. 18 and 19 show a flat top plate 346 at the top of the upper most rods. This is similar to the top plate shown in FIGS. 3 and 4 for the three rod embodiment. It can be a simple flat plate unlike the shelf which has raised rims on the sides and the end. Decorative balls 350 can be threaded on top thereof in an arrangement similar to that illustrated in FIG. 11.

Figure 15:
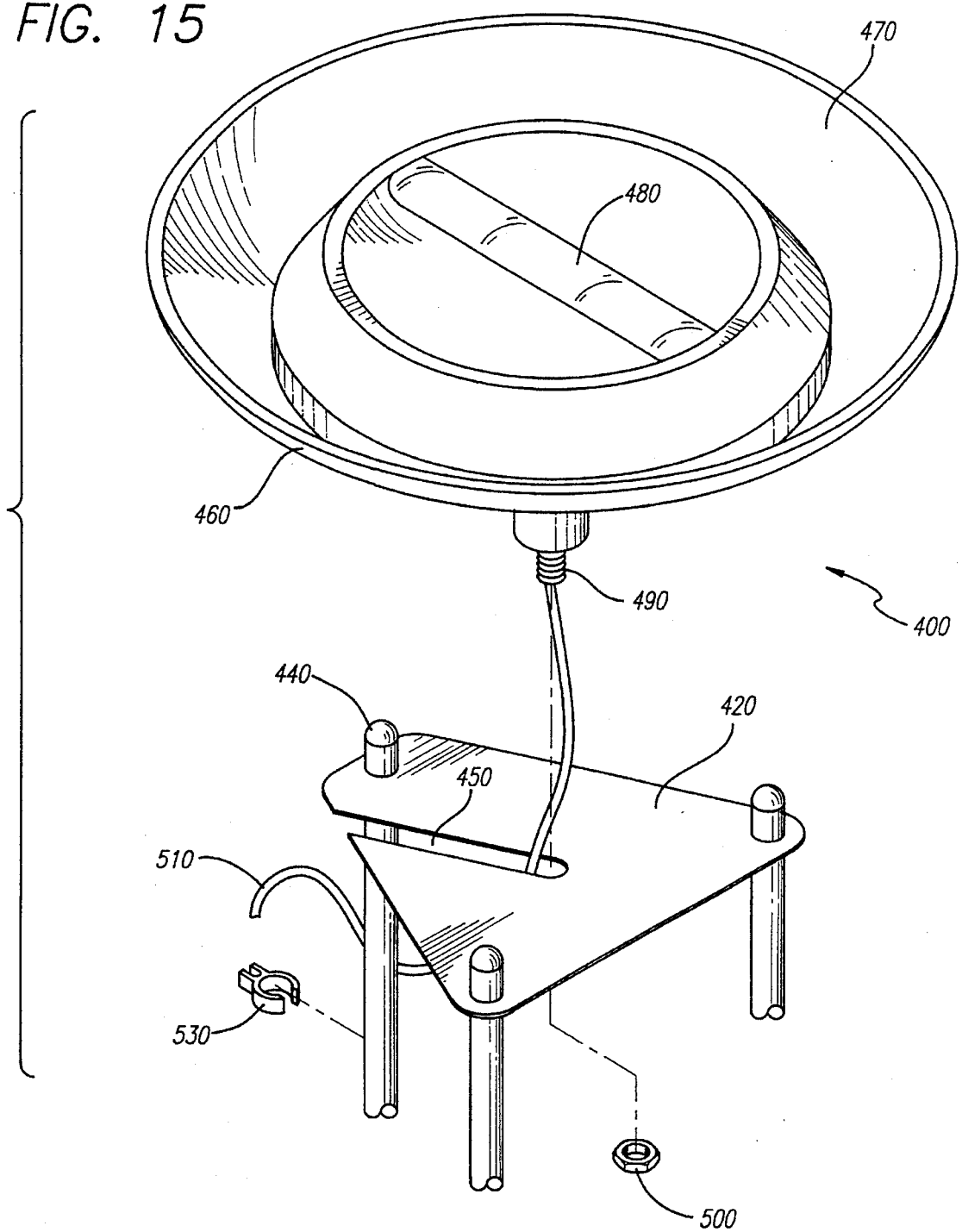
FIG. 15 is a perspective partially exploded view of an alternative lamp top embodiment of a three rod tower assembly of the invention.
Figure 16:
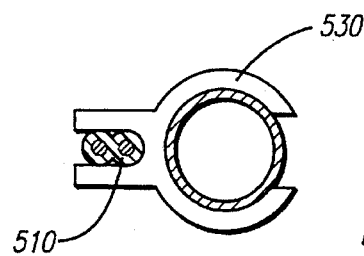
FIG. 16 is an enlarged cross-sectional view of the lamp cord clamp of FIG. 15, in place on a tower rod.
Figure 17:
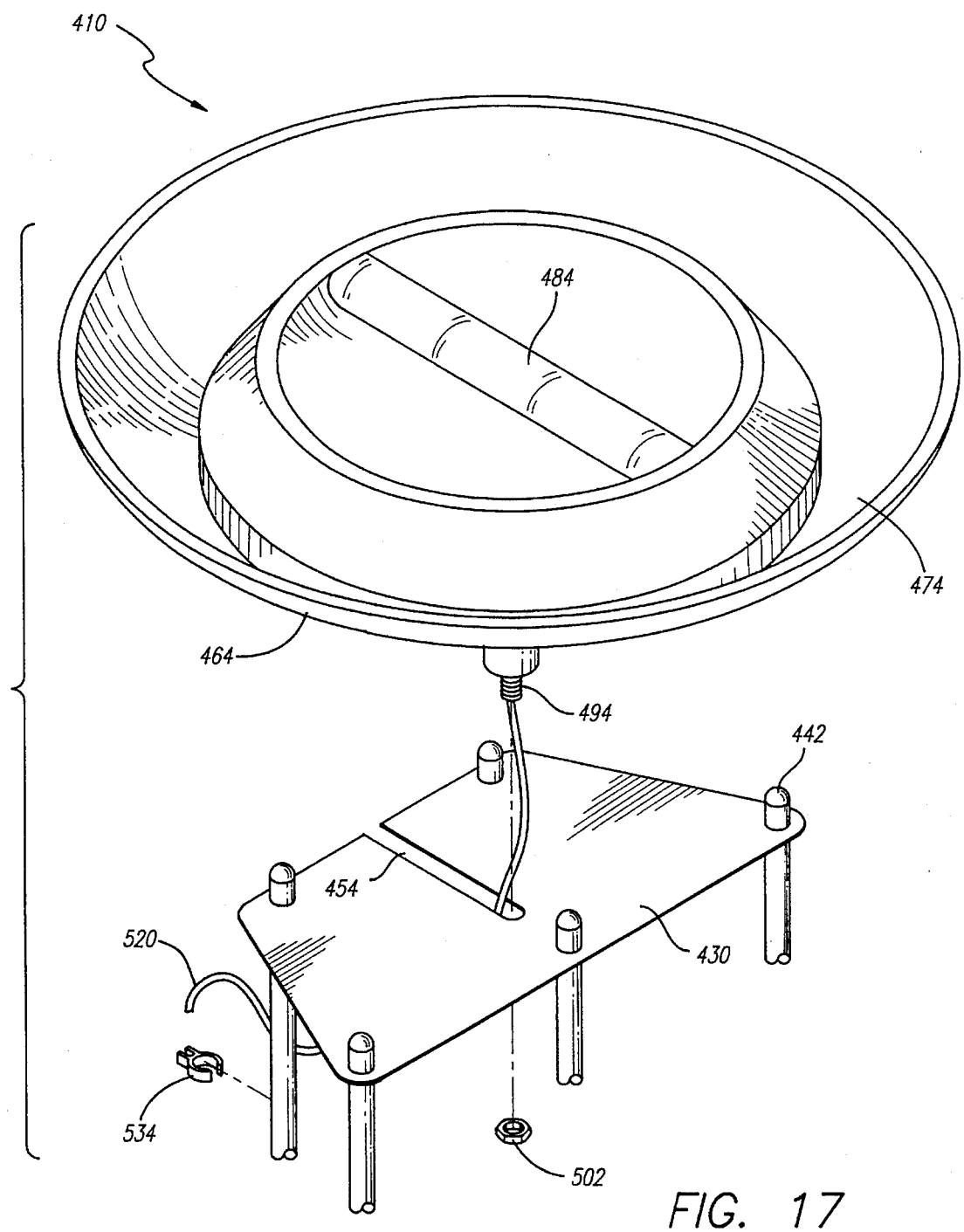
FIG. 17 is perspective view similar to FIG. 15 of an alternative lamp top embodiment of a five rod tower assembly.

Instead of the flat plate and balls as shown in FIGS. 3, 4, 18 and 19, a lamp embodiment can be used as shown in FIGS. 15 and 17. The FIG. 15 embodiment as shown generally at 400 is for the three rod embodiment(s), and the FIG. 17 as shown at 410 is for the five rod embodiment. Each of them has a flat plate 420, 430, respectively, fitted onto the top of the top screws of the uppermost rods. Plain nuts 440, 442 are shown threaded on top of the plates 420, 430 to hold them in place and to provide a decorative more attractive appearance. The plates 420, 430 also have a slot 450, 454 extending from an edge thereof to the center in through which the bottom portion of a upperwardly facing lamp 460, 464 is slid. The lamp 460, 464 has upwardly disposed bowl or shield 470, 474 reflecting the light upward against the adjacent ceiling and walls and a bulb 480, 484 in the center. Depending down from the shield is a threaded member 490, 494 which fits into the slot 450, 454 and a nut 500, 502 is threaded to the bottom of this threaded member on the opposite side of the plate 420, 430 to fix the lamps in place. The electrical cord 510, 520 for the lamp 460, 464 can be held out of the way to one of the back rods with a clamp 530, 534 such as shown in FIGS. 15 and 17 and shown in greater detail in operation in FIG. 16. Other clamps or clips can be provided as would be apparent to those skilled in the art. The clamps 530, 534 not only hold the wire 510, 520 so that it is less visible but also so that it is less likely to become caught or otherwise entangled.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the claims appended hereto.

What is claimed is:

1. A storage and display assembly, comprising:

a support base;

a first set of rods releasably mountable into upright, spaced securement on said base;

a second set of rods threadable onto tops of respective ones of said rods of said first set and extending vertically up therefrom;

a fixed shelf held in level disposition at a juncture between said first and second sets of rods;

a first adjustable shelf having openings through which at least some of said rods of said second set pass such that said first shelf is slidable along said rods; and first supporting means for supporting in generally level disposition said first shelf at a desired height on said second set.

2. The assembly of claim 1 wherein said rods of said first set are threadable into securement on said base.

3. The assembly of claim 1 further comprising a second adjustable shelf having openings through which at least some of said rods of said first set pass such that said second shelf is slidable along said rods, and second supporting means for supporting in generally level disposition said second shelf at a desired height on said first set.

4. The assembly of claim 1 wherein said rods of said first set have ledges at tops thereof which support said fixed shelf.

5. The assembly of claim 1 wherein said fixed shelf is sandwiched between adjacent ends of rods of said first and second sets.

6. The assembly of claim 1 wherein said base, said rods and said fixed shelf define at least in part a tower, and further comprising a lamp supported by and generally above said tower.

7. The assembly of claim 6 further comprising a top plate supported by said tower at an upper location thereof and supporting said lamp.

8. The assembly of claim 7 wherein said top plate includes a lamp receiving slot, and said lamp includes a retaining member which secures said lamp at a desired location in said receiving slot.

9. The assembly of claim 6 wherein said lamp includes an electric cord, and further comprising at least one clip attaching said electric cord to one of said rods.

10. The assembly of claim 6 wherein said lamp is constructed and mounted for illuminating generally upwards relative to said tower.

11. The assembly of claim 1 wherein said first shelf comprises a flat plate having side and back upward retaining lips.

12. The assembly of claim 11 wherein said flat plate is substantially rectangular.

13. The assembly of claim 1 wherein said first supporting means includes squeeze clamps on at least some of said rods of said second set providing underneath support for said first shelf.

14. The assembly of claim 1 wherein said first set of rods comprises three rods arranged as a triangle with an apex of the triangle being at a rearward portion of said support base and a base of the triangle being at a forward portion of said base.

15. The assembly of claim 1 wherein said first shelf openings include at least one crescent shape opening engaging an adjacent edge of said first shelf and a round opening spaced inward from an adjacent edge of said first shelf.

16. The assembly of claim 1 wherein said fixed plate has a plurality of openings through which rods of said first or second sets pass.

17. The assembly of claim 1 wherein said first set of rods comprise five rods arranged in a trapezoid-like shape with four of said five rods at respective corners of the trapezoid and a fifth in a center of a long side of the trapezoid.

18. The assembly of claim 17 wherein said fixed shelf has a trapezoid shape.

19. The assembly of claim 17 wherein said second set of rods comprise five rods, and said first adjustable shelf is generally rectangular and said openings consist of three openings for three of said five rods of said second set, and further comprising a second adjustable shelf having three openings through which three of said five rods of said first or second sets pass, and second supporting means for supporting in generally level disposition said second shelf at a selected height on said first or second set different than the height of said first adjustable shelf.

20. The assembly of claim 19 wherein said first and second adjustable shelves are positioned on different sets of three of said five rods and are staggered relative to one another.

21. The assembly of claim 1 further comprising end caps fitted onto upper ends of said rods of said second sets.

22. The assembly of claim 21 wherein said end caps comprise decorative balls threaded onto said upper ends of said rods.

23. The assembly of claim 1 wherein said base includes a generally flat weighted structure having a plurality of threaded members extending up from a top surface thereof and onto which lower ends of said rods of said first set are threadably secured.

24. The assembly of claim 23 further comprising a plate generally on said base and having openings through which said threaded members pass.

25. The assembly of claim 1 wherein said fixed shelf comprises a flat plate shelf, and said first set of rods comprises three rods arranged as a triangle.

26. The assembly of claim 1 wherein said fixed shelf comprises a flat plate shelf, and said first set of rods comprises five rods arranged as a trapezoid-like shape.

* * * * *